US005875429A

United States Patent [19]

Douglas

[11] Patent Number: 5,875,429

[45] Date of Patent: Feb. 23, 1999

[54] METHOD AND APPARATUS FOR EDITING DOCUMENTS THROUGH VOICE RECOGNITION

[75] Inventor: H. Russel Douglas, Houston, Tex.

[73] Assignee: Applied Voice Recognition, Inc., Houston, Tex.

[21] Appl. No.: 859,127

[22] Filed: May 20, 1997

[51] Int. Cl.[6] ........................................................ G10L 7/08

[52] U.S. Cl. .......................... 704/275; 704/235; 707/531

[58] Field of Search .................................... 704/270, 271, 704/275, 235; 707/513–516, 530, 531

[56] References Cited

U.S. PATENT DOCUMENTS

| | | | |
|---|---|---|---|
| 4,582,441 | 4/1986 | Carter et al. | 400/712 |
| 4,764,965 | 8/1988 | Yoshimura et al. | 704/275 |
| 4,829,576 | 5/1989 | Porter | 704/275 |
| 5,761,641 | 6/1998 | Rozak et al. | 704/275 |

*Primary Examiner*—David R. Hudspeth
*Assistant Examiner*—M. David Sofocleous
*Attorney, Agent, or Firm*—Gunn & Associates, P.C.

[57] ABSTRACT

The present invention provides a method and apparatus that places visual markers onto the display of a document on a graphical user interface. The visual markers assist in the navigation around the document by numbered artifacts.

7 Claims, 9 Drawing Sheets

METHOD AND APPARATUS FOR EDITING DOCUMENTS THROUGH VOICE RECOGNITION

FIELD OF THE INVENTION

The present invention relates generally to the field of methods and devices for editing documents and, more particularly, to a method and apparatus to facilitate the editing of documents by the application of voice recognition.

BACKGROUND OF THE INVENTION

Documents frequently require comments or editorial changes from a preliminary draft. The user wishing to edit the draft document may be editing his own work or that of another. In the state of technology today, this task is often undertaken using a word processing system on a computer.

To edit a draft document, the editor may call up the document for display on the screen of the computer. Then, using an input device such as a mouse, a touch-screen input controller, or other device, the editor directs the location of a cursor to locate where additions, deletions, or changes are to occur. Although the use of a mouse or other cursor locator device has proven to be a major advancement over previous devices for locating a cursor, use of such a device still requires that the editor take his hands off the keyboard on which he is inputting data and/or text to take control of the peripheral input device such as the mouse. He then manipulates the mouse to direct the cursor to the desired location in the document, and then he must return his hand to the keyboard for further work. This sequence takes time and interrupts the flow of the editors work on the document.

Various tools have been developed for navigating around a document using voice commands. Most commonly, a standard set of commands which correspond to the navigation commands of the word processing application are stored in a voice memory. Then, when the editor utters the command, the command is recognized by comparison with the stored memory, and the navigation command is carried out. For example, the editor will speak the word "sentence" a number of times to "train" the voice recognition unit to recognize this sound from this editor. Then, when the editor is working on a document and utters the word "sentence", the voice recognition unit recognizes the command and issues the function command to move the cursor to the beginning of the next sentence, exactly as if the editor had pressed the function keys on his keyboard for this command in the word processing program.

This known system has proven to be a boon in operation but, in its own way, has been limited to the standard commands that are provided by the word processor. However, even using such a system the editor may faced with a lengthy document with few if any visual elements to guide him through the document during the editing process. Thus, there remains a need for a system that is adaptable to word processing and editing systems, spread-sheet programs, computer assisted drawing programs, or any other applications in which an editor makes changes to an existing file which viewing the file on a graphical user interface and which provides visual "aids to navigation" to assist in the editing process.

SUMMARY OF THE INVENTION

The present invention solves these and other drawbacks of the prior art by providing a method and system which develop graphic clues using voice recognition technology to allow a user to easily navigate and control the contents of windows. In order to simplify the process of moving around within a text or other document, this system provides a set of visual aids to navigation.

The system recognizes its own set of voice commands which expand on recognizable voice commands in the prior art. However, this set of voice commands unique to the present invention develop a graphical overlay throughout the document of interest to lay out a visually perceptible structure around the document. When the user who is editing a document issues a voice command to detect, show, or highlight a particular identifiable attribute within the document, the system scans the document for the attribute and creates an overlay keyed to each occurrence of this attribute throughout the document. The overlay is preferably developed by simply altering the foreground and background pixels adjacent or even on top of the particular attribute of interest. By simply altering the color, hue, or intensity of the pixels at the attribute of interest, the attribute itself is not obscured, but rather is made more prominent on the graphic display.

The system and method preferably recognize two portions of the order issued by the user: a command and a target. The command portion is recognized as a defined action by the system, and the target portion is recognized as where to perform the defined action. The overlay described above simply provides an easily discernible sets of targets for the user to choose from.

These and other features of the present invention will be immediately apparent to those of skill in the art from a review of the following detailed description and the accompanying drawing figures.

BRIEF DESCRIPTION OF THE DRAWINGS

For a more complete understanding of the present invention and the features and advantages thereof, reference is now made to the Detailed Description in conjunction with the attached Drawings, in which.

DETAILED DESCRIPTION OF A PREFERRED EMBODIMENT

Figure 1:
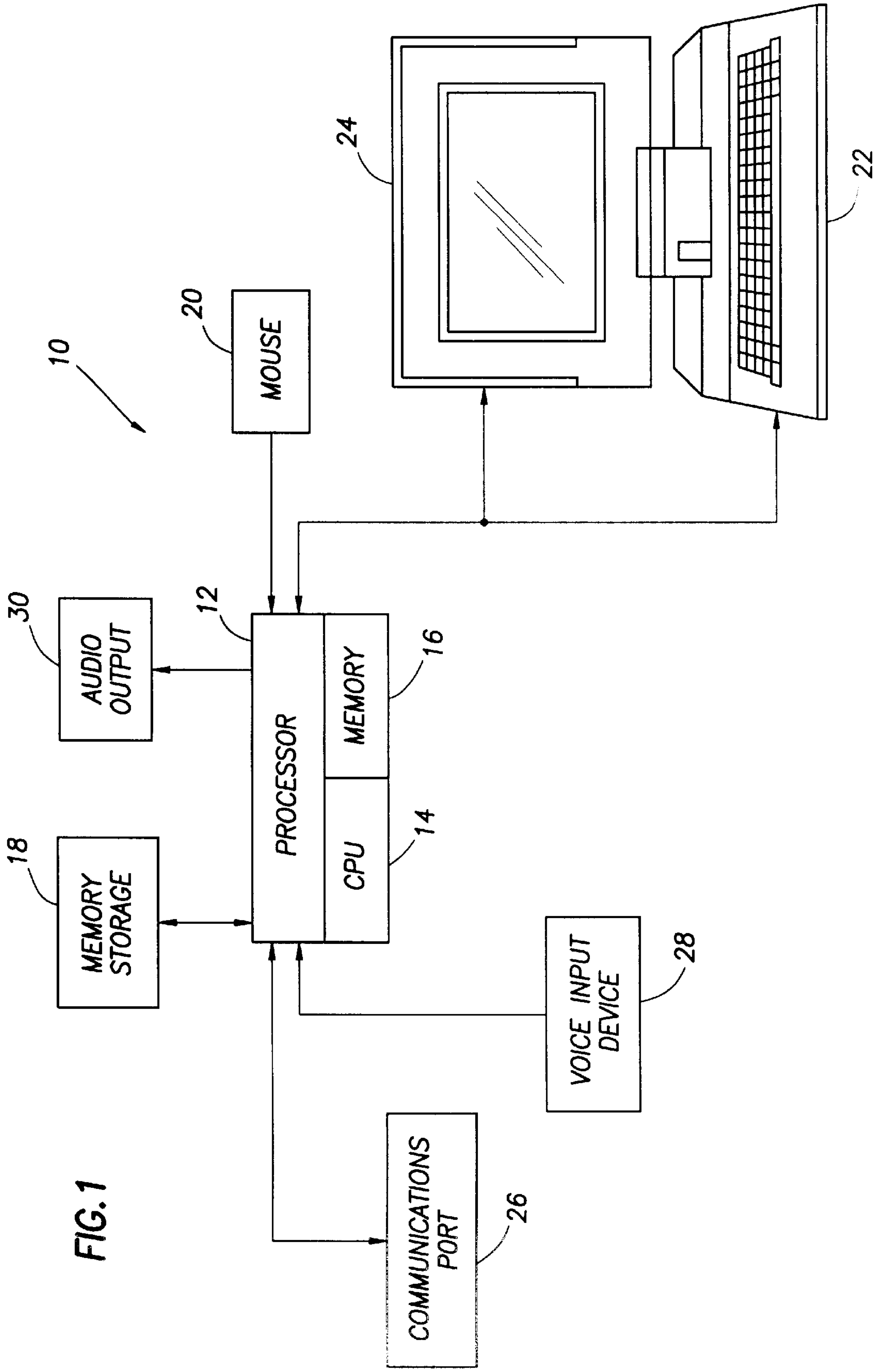
FIG. 1 is a block diagram of a general data processing system wherein the present invention may advantageously find application.

FIG. 1 depicts a block diagram of a data processing system 10 wherein the present invention finds useful application. As used herein, the term "data processing system" is used in its broadest sense to include computing and processing means, including peripheral devices, that may be used for calculating, word processing, spread sheet applications, and the like.

The data processing system 10 includes a processor 12, which includes a central processing unit (CPU) 14 and a memory 16. Additional memory 18 is preferably connected to the processor 12, and this additional memory may comprise one or more floppy or hard disk drives, magnetic tape, or other memory means.

The data processing system 10 also includes user interface hardware, including a mouse 20, a keyboard 22, and a CRT 24 or other type of display screen for presenting visual data to the user. The data processing system 10 may also include a communications port 26 for communicating with a network or other data processing systems. The data processing system 10 further includes a voice input device 28 for receiving voice commands from a user and implementing those commands in the processor 12. Finally, the system 10 includes an audio output device 30, which may comprise a speaker or headphone jack.

Figure 2:
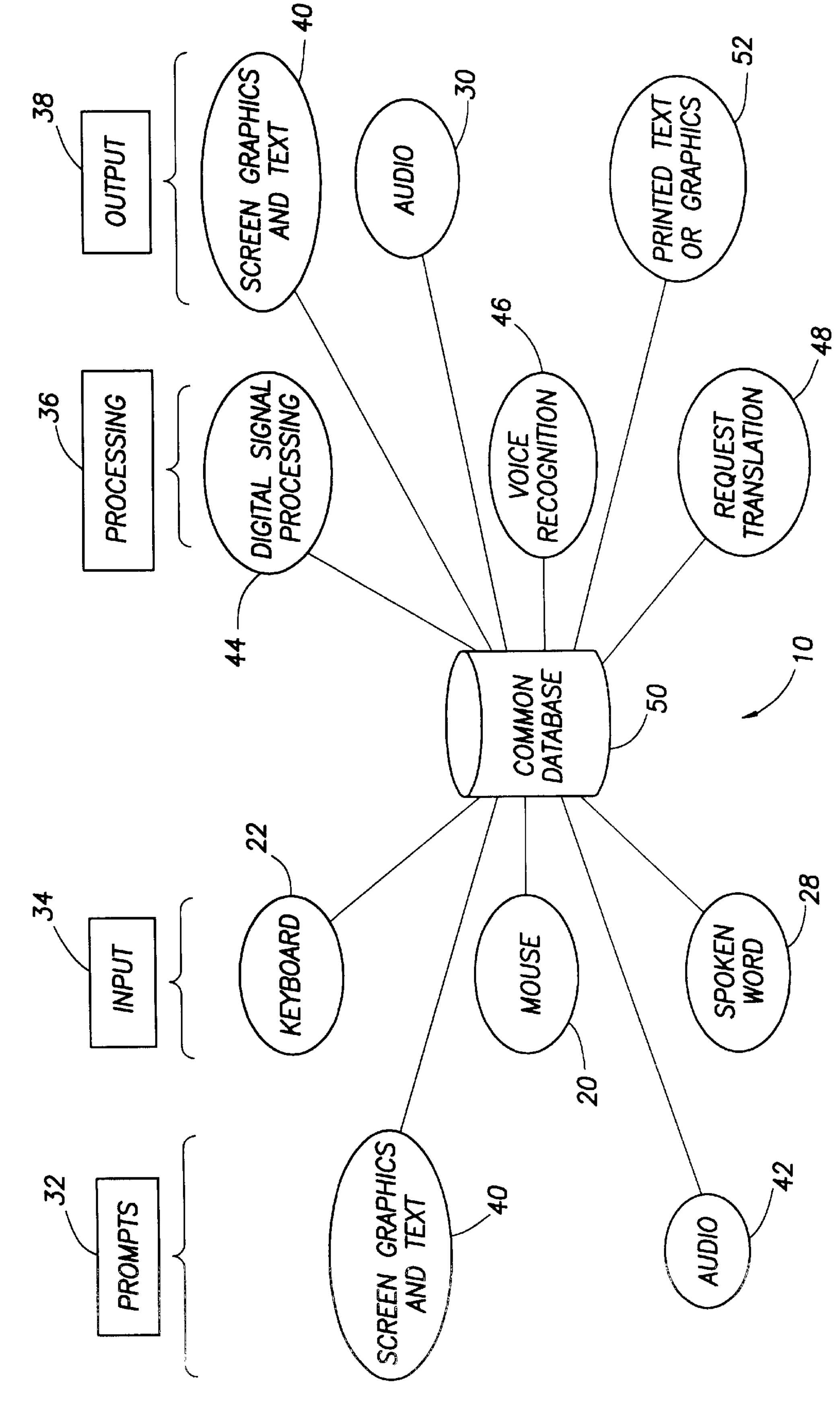
FIG. 2 is a block diagram of the portion of the data processing system which includes the voice recognition structure and associated devices to carry out the present invention.

FIG. 2 depicts in greater detail a logical component diagram of the system 10. The various logical components of the system are separated into prompts 32, inputs 34, processing elements 36, and outputs 38, for ease of explanation. In using the system, a user is presented with visual prompts 40 in the form of screen graphics and text and audible prompts 42. In general, the visual prompts 40 are displayed on the display 24, while the audible prompts 42 are provided through the audio output 30.

A number of inputs 34 feed the system 10. Typed input is received into the system through the keyboard 22. Positional information is delivered to the system via the mouse 22, as well as selection information delivered as button clicks at a particular position determined from the coordinates of the mouse. Spoken words are delivered to the system through the voice input device 28, typically a microphone.

As with all digital computers, the present system operates digitally. Consequently, voice input from the input device 28 is digitized by a digital signal processing device 44, which may typically be embodied on a sound card in a manner well known in the art. The output of the digital signal processing device 44 is converted into a series of phonemes in the processor 12. The phonemes are then interpreted through a process referred to as speech (or voice) recognition in the voice recognition unit 46 into understandable "words" in the current language model of the one speaking into the voice input device 28. These "words" are translated into actions in the request translation unit 48. The request translation unit 48 parses the recognized words and associates the recognized words with one of a number of stored actions contained in a common data base 50. The result of the action is presented to the user in the form of visible output via the screen graphics and text 40 displayed on the display 24, audible out from the audio output unit 30, and/or hard copy output from another suitable output device such as a printed text/graphics unit 52.

In operation, a user is faced with the task of editing a document, which may include text, graphics, or other data. It will be understood by those of skill in the voice recognition art that the present invention is equally applicable during the initial drafting of such a document, but the examples that follow are shown from the point of view of an existing document.

Once the user has displayed the document on the screen 24, he issues orders to the system by speaking into the voice input device 28. It is assumed that the system has been "trained" to recognized the voice of the user, thereby developing the language model of the user, as previously described. When an order is parsed and understood by the system, the translated command may be provided to the user by the system through the audio output device 30, or a computer generated voice may tell the user that the order was not understood. For an understood order, the system recognizes the order as comprising a command and a target. The command may take the form of a word processing command, such as "show", "GoTo", "cut", etc. The target comprises an identifiable locations within the document. The present invention is directed to receiving orders from the user, developing visible signposts or artifacts for display along with the document, and thereby providing further or more easily identifiable locations within the document. These easily identifiable locations are displayed by way of an overlay on the document.

Figure 3:
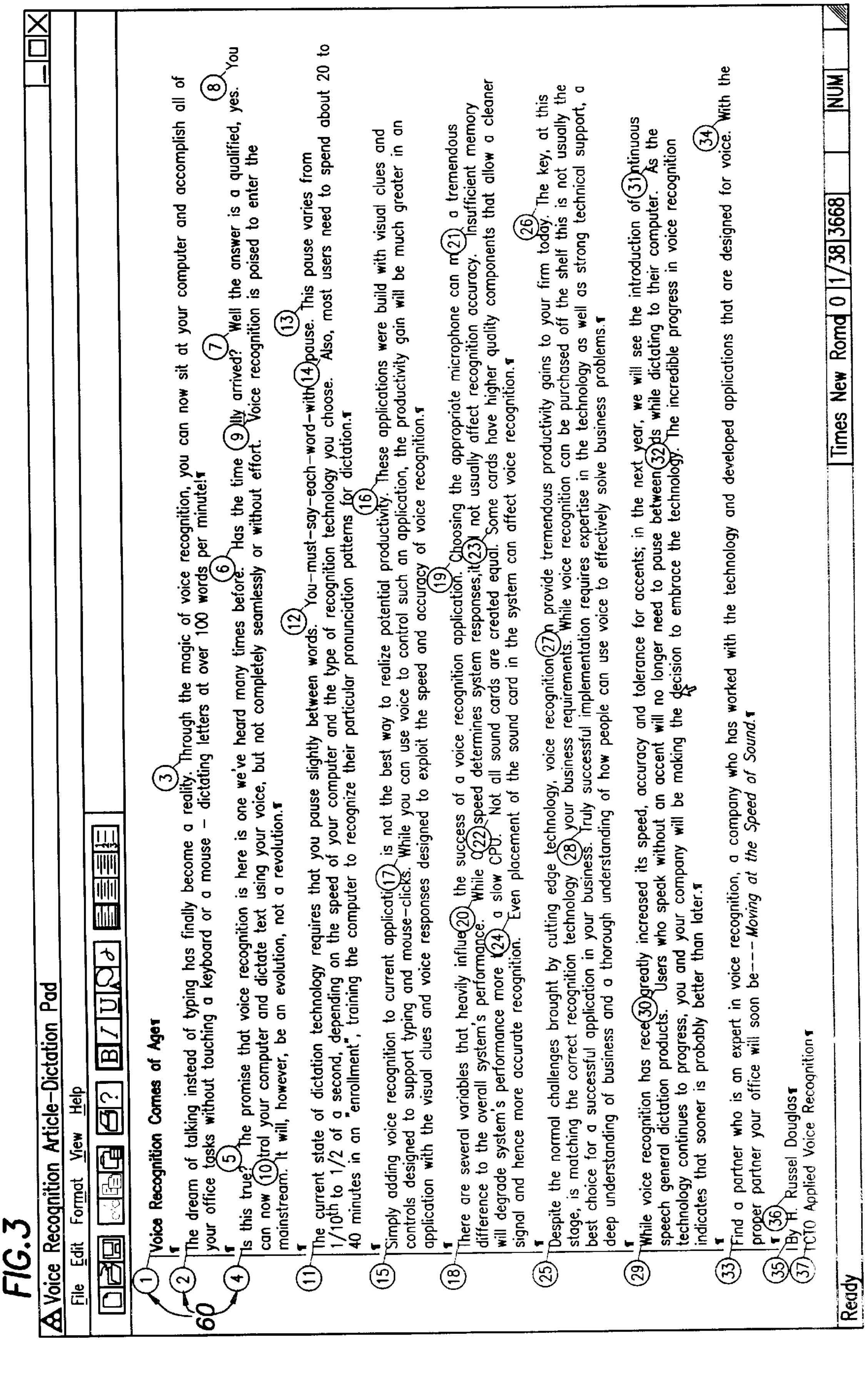
FIGS. 3 through 8 depict screen displays which are generated by application of the present invention.

Referring now to the graphical displays of FIGS. 3–8, inclusive, FIG. 3 depicts an example of the visual clues being applied at the sentence level. This display is created when the user says "Show Sentences", for example. The system of the present invention scans the document and identifies each sentence by an artifact 60. The graphics overlay is then created with a sequential number at the start of each sentence. In the preferred embodiment as shown in FIG. 3, the artifact is displayed adjacent the beginning of each sentence, but those of skill in the graphics display art will be able to create an almost unlimited number of ways to display a signpost to visually key each sentence. For example, the first letter or the first word of each sentence could be displayed in a contrasting background and foreground color and a separate window created to show a sentence count at the location of the cursor. However, the present invention preferably numbers each occurrence of the designated targets to provide a navigation aid to the user.

To move the cursor to the seventh sentence of the document shown in FIG. 3, the user next issues a voice command, such as "GoTo 7". The spoken words are interpreted by the voice recognition software as a command GoTo and a target 7. The command means reposition and a location. The system places the cursor at the position where it previously placed the numeric 7.

Figure 4:
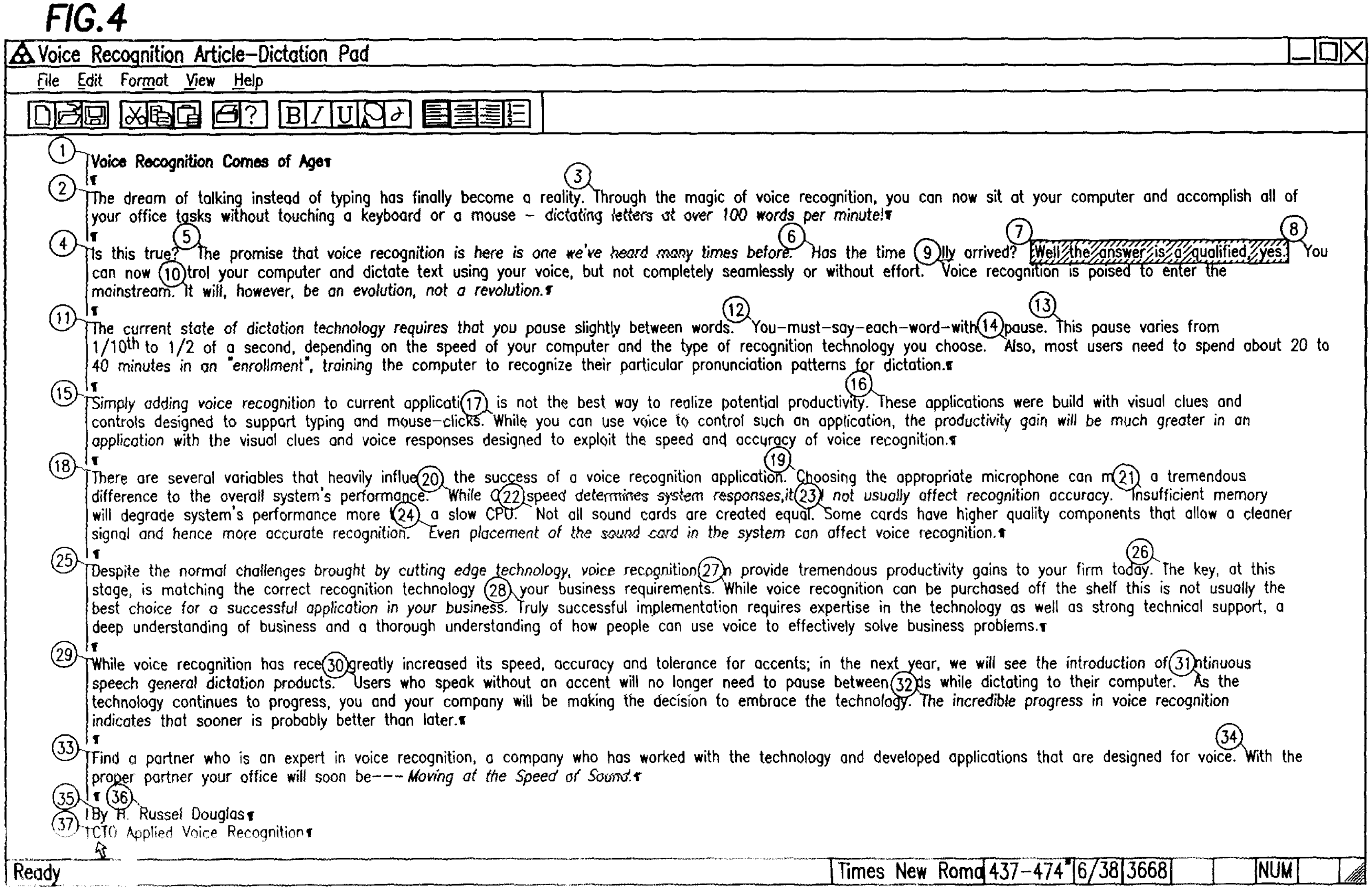

In addition to the overlay, targeting, and navigation commands of the present invention, the user also has all of the normal editing commands available. For example the command "Select Sentence" causes the system to highlight the sentence immediately following the current location of the cursor, as shown in FIG. 4.

Figure 5:
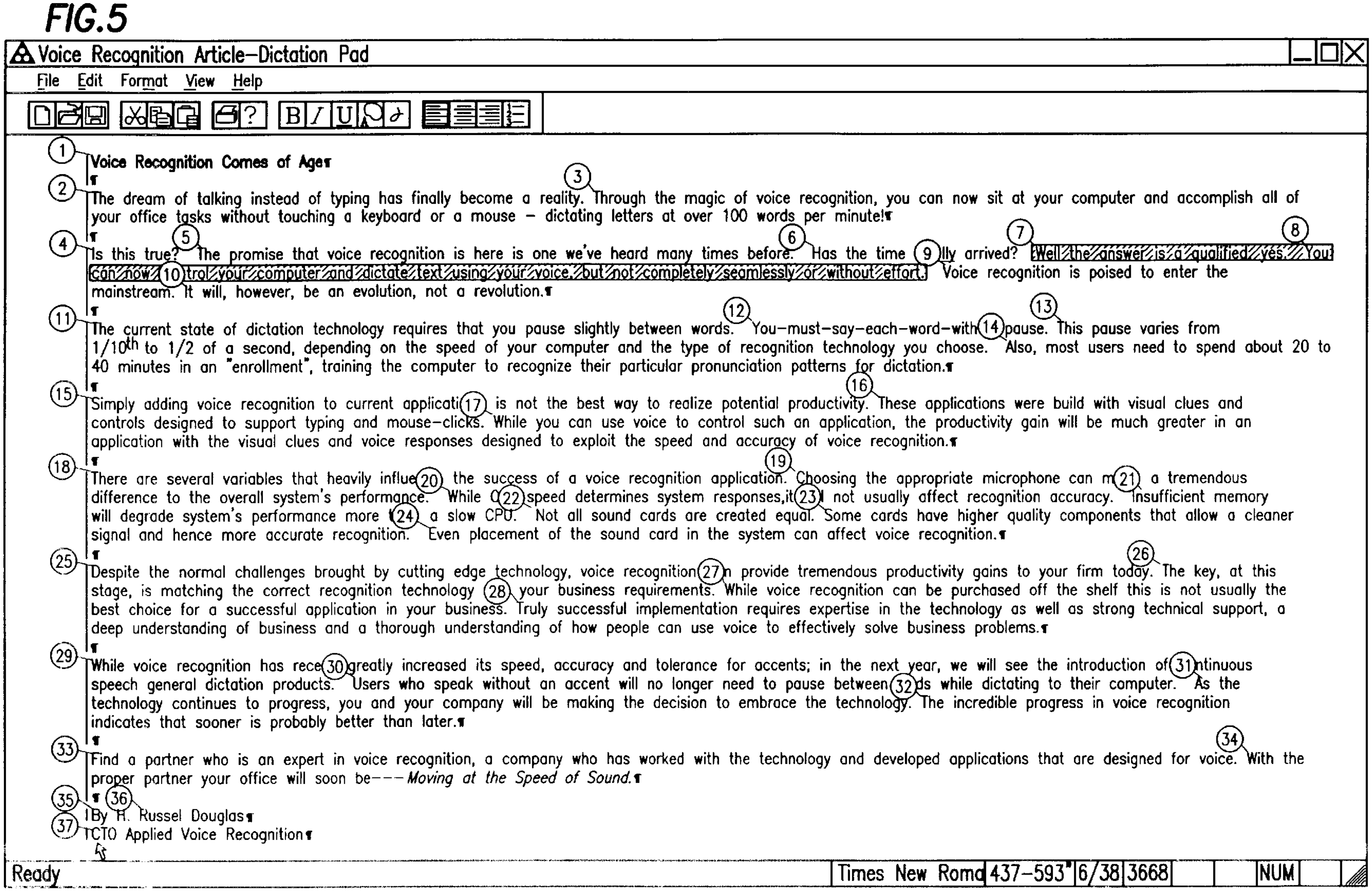
Figure 6:
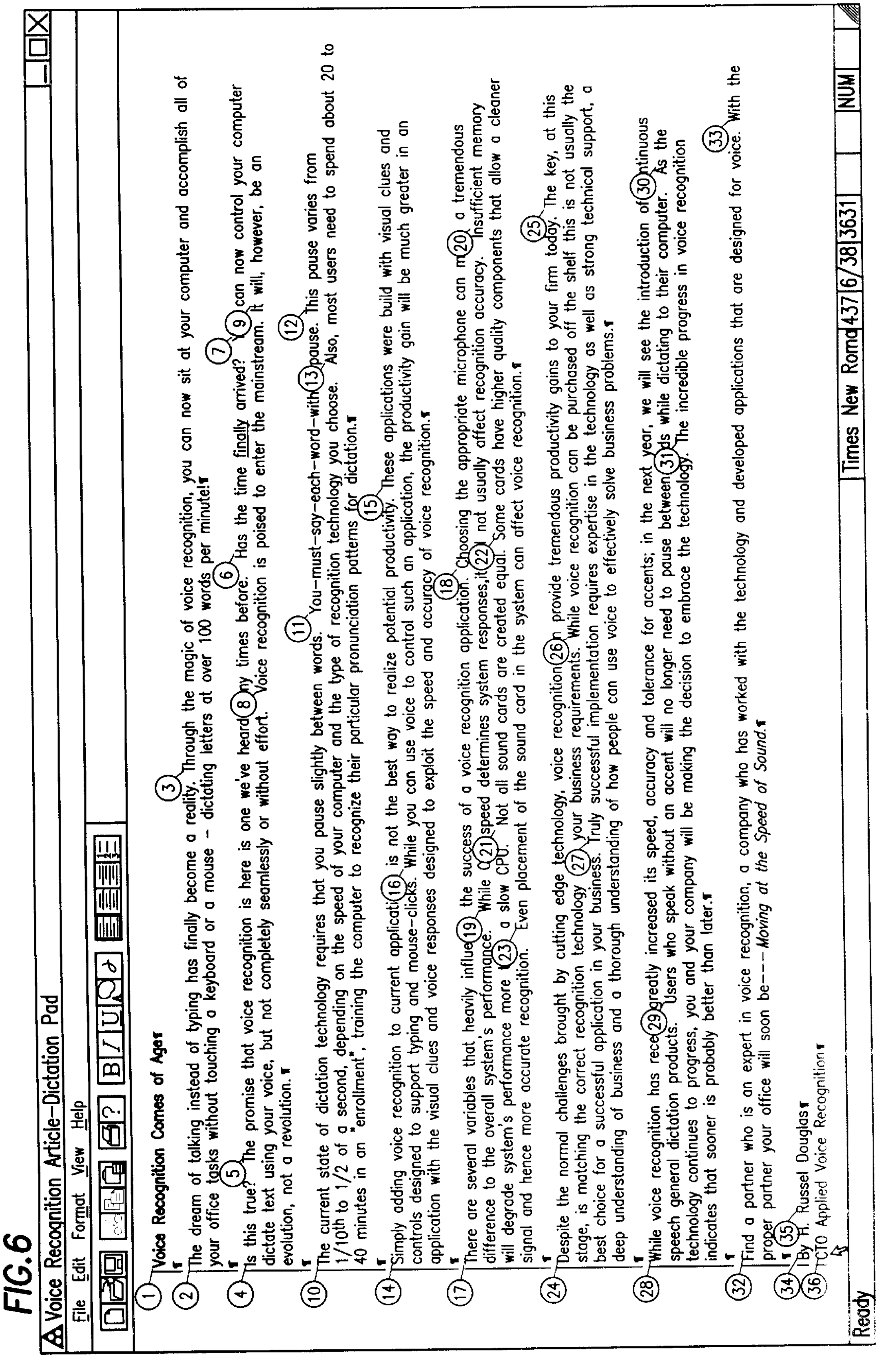

FIG. 5 depicts yet another feature of the present invention. The system remembers the context of the last command to further ease editing. If the user had just said "Select Sentence" as in FIG. 4, the command "Select More" adds the next sentence to the selection, so that now the seventh and the eighth sentences are highlighted. If the user next utters the command "Cut", the highlighted portion of the document is removed from the document and renumbering is carried out immediately, as shown in FIG. 6.

The numbering system can be set to indicate any level of granularity the user chooses. In other words, the user can choose to have the numbering system highlight the document by paragraph or word, etc. After each editing function, such as cut, copy, or paste, the system renumbers from the beginning of the documents based on the currently active granularity (i.e., sentence, word, paragraph, etc.).

Figure 6A:
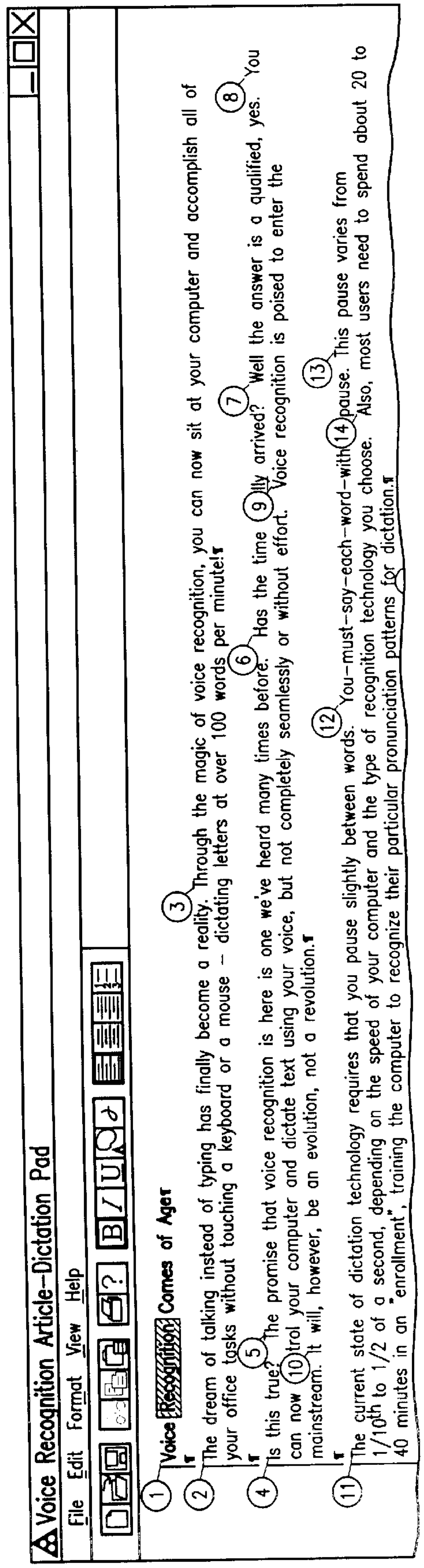

A further refinement of the process involves moving the current editing position directly to the word. In this case, the user may issue the order "Edit Recognition". The system parses the words of this order, thereby recognizing the first word as a command and the second word as a target. This is done with the underlying language model of the user, as previous described. This language model contains syntax specifically targeted to windows commands and editing. Since the first word naturally requires a target word it begins searching the document from the current cursor position forward in the document. If the current cursor position is the top of the document, the result of issuing the command would appear as shown in FIG. 6*a*.

Figure 7:
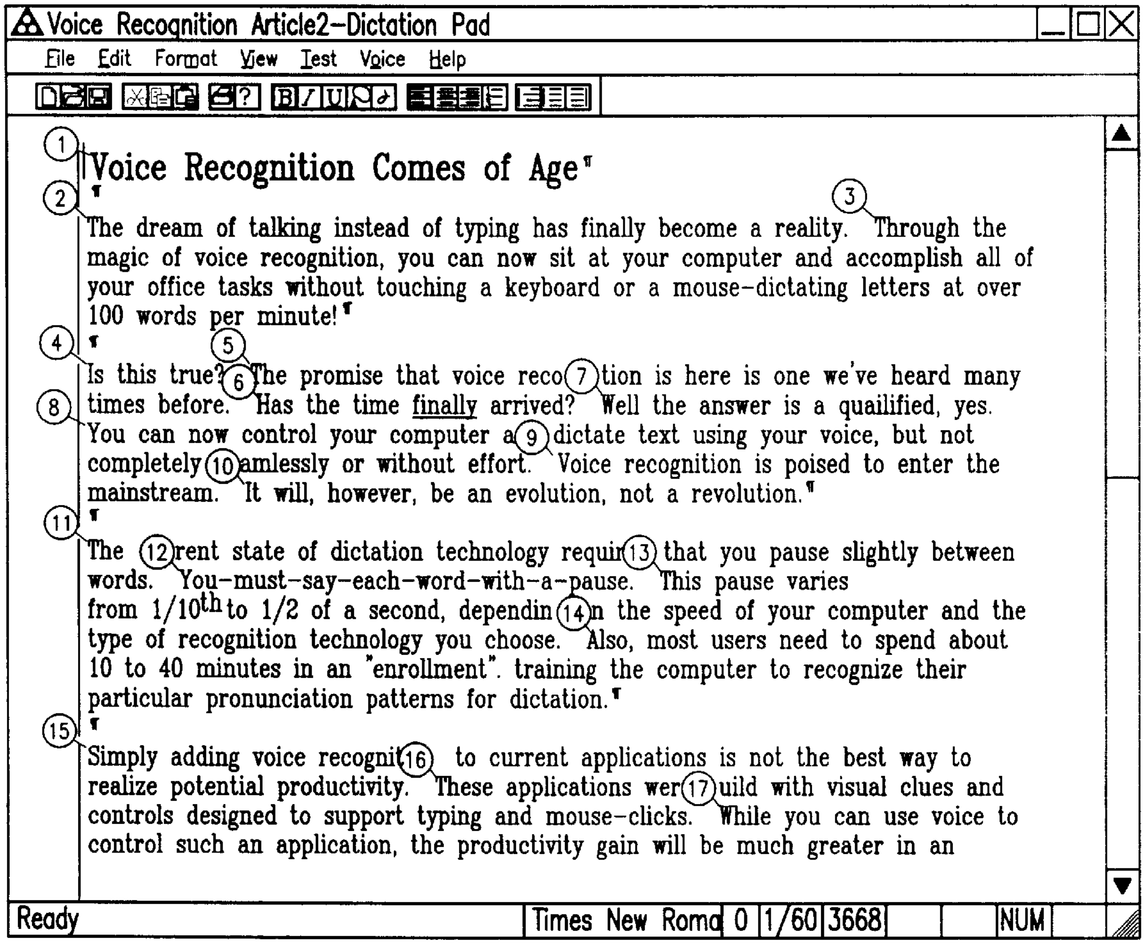

For visually impaired users, the system has a mode that enlarges the graphics marks and text with a simple command. The user says "Show Zoom" and the system enlarges both the numeric markers and the associated text, as shown in FIG. 7. This is a view option and does not affect the font sizes or format of the final document or how the document is ultimately printed.

The zoom amount is controlled by the user. He can specify that the zoom should be 150%, 200% etc. It is parameter driven and can be reset by simply changing the % on an options screen, which may be shown in a distinct window in a manner shown in the art. This allows the user to adjust the zoom characteristics to suit his visual requirements.

In some cases, the window that the user is trying to edit is not a text window. In this case, there is no way to scan for any text oriented input. With no regular line oriented input a different model must be invoked for navigation.

Figure 8:
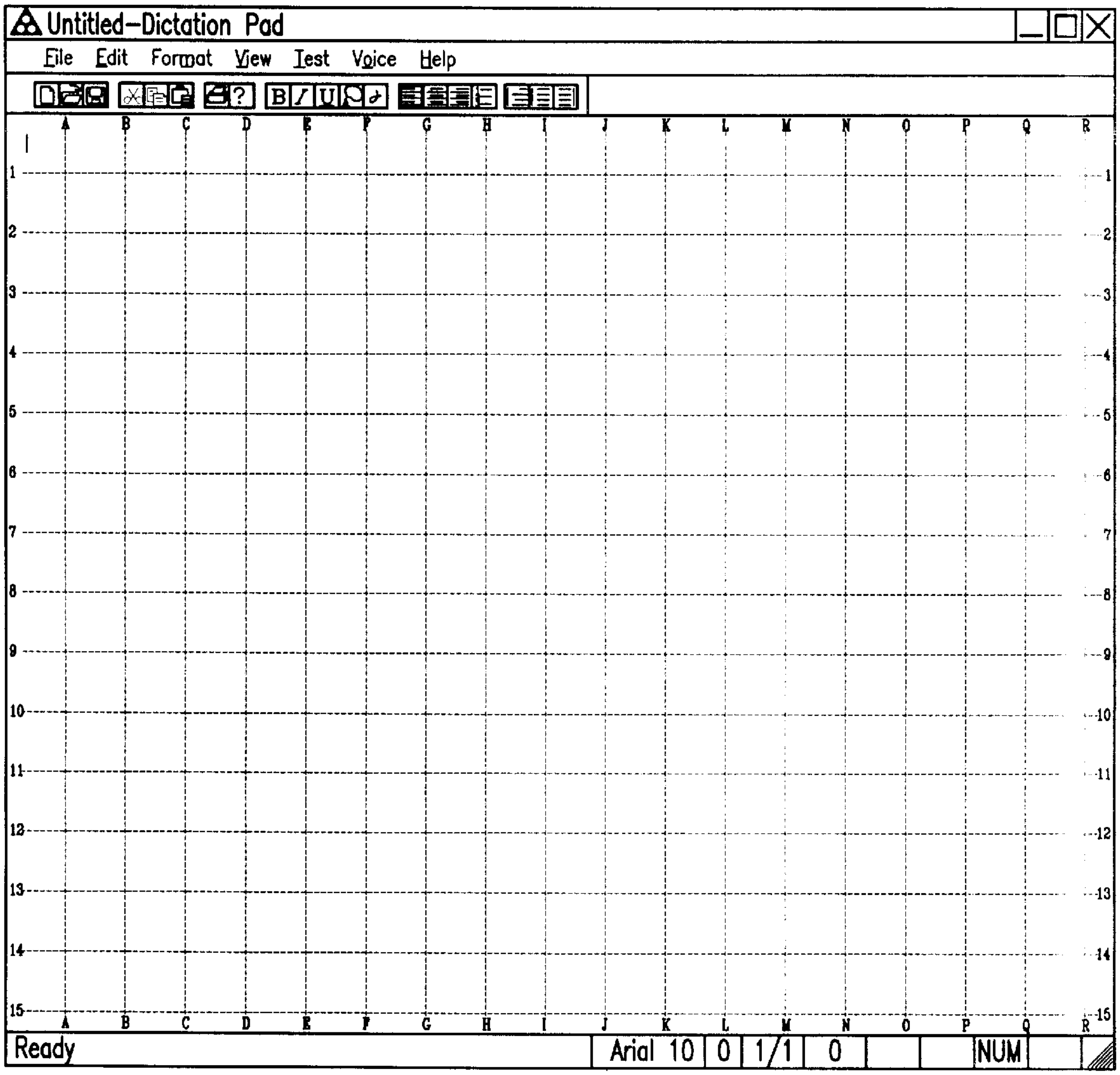

The user can invoke a grid overlay to allow accurate navigation within a window. The command "Show Grid" invokes an overlay as shown in FIG. 8.

In the default mode, the horizontal lines within the grid are marked with Arabic numbers on the left and right sides of the window. The numbers begin with the topmost visible line and increase by one for each successive lower grid line. The vertical lines within the grid are marked with the letters of the alphabet on the top and bottom of the window. The letters begin with the leftmost line and utilize each successive letter in the alphabet for the next grid line to the right. This number/letter scheme is also set by options panel. The user can choose to have the system lower numbers on the right and increase to the left if this is more natural to the user.

The principles, preferred embodiments, and mode of operation of the present invention have been described in the foregoing specification. This invention is not to be construed as limited to the particular forms disclosed, since these are regarded as illustrative rather than restrictive. Moreover, variations and changes may be made by those skilled in the art within departing from the spirit of the invention.

I claim:

1. In a data processing system including a central processing unit, a voice recognition unit, and a graphical display, a method of displaying navigation artifacts on the display of a document, the method comprising the steps of:

a. receiving a voice order by the voice recognition unit, the voice order comprising a command portion and a target portion;

b. parsing the command portion of the voice order by the central processing unit to determine locations within the document of targets designated by the voice order;

c. ascertaining within the document the location of each target determined by the step of parsing; and d. placing an artifact on the display at the location of each target ascertained.

2. The method of claim 1 wherein the artifact comprises a sequentially numbered emblem at each target location within the document.

3. The method of claim 1 wherein the target comprises a sentence within the document.

4. The method of claim 1 wherein the target comprises a word within the document.

5. The method of claim 1 wherein the target comprises a paragraph within the documents.

6. A display system for displaying visible artifacts in a document in a data processing system, the display system comprising:

a. a central processing unit;

b. a voice recognition unit to provide command input to the central processing unit;

c. a graphical display to provide visible output from the central processing unit;

d. the voice recognition unit providing means for receiving a voice order by the voice recognition unit, the voice order comprising a command portion and a target portion; and e. means within the central processing unit i. for parsing the command portion of the voice order to determine locations within the document of targets designated by the voice order;

ii. for ascertaining within the document the location of each target determined by the step of parsing; and iii. for placing an artifact on the display at the location of each target ascertained.

7. The display system of claim 6, wherein any artifact placed on the display is visually distinct from any other artifact placed on the display.

* * * * *